United States Patent
Cartridge et al.

(10) Patent No.: US 6,770,704 B2
(45) Date of Patent: Aug. 3, 2004

(54) THICKENERS

(75) Inventors: David John Cartridge, Manchester (GB); Dean Thetford, Manchester (GB); John David Schofield, Manchester (GB); Paul Gough, Manchester (GB); Stuart Nicholas Richards, Manchester (GB)

(73) Assignee: Avecia Limited, Manchester (GB)

( * ) Notice: Subject to any disclaimer, the term of this patent is extended or adjusted under 35 U.S.C. 154(b) by 0 days.

(21) Appl. No.: 10/297,324

(22) PCT Filed: May 21, 2001

(86) PCT No.: PCT/GB01/02245

§ 371 (c)(1),
(2), (4) Date: Dec. 5, 2002

(87) PCT Pub. No.: WO01/94481

PCT Pub. Date: Dec. 13, 2001

(65) Prior Publication Data

US 2003/0171485 A1 Sep. 11, 2003

(30) Foreign Application Priority Data

Jun. 9, 2000 (GB) .............................................. 0014117
Mar. 13, 2001 (GB) .............................................. 0106076

(51) Int. Cl.$^7$ .............................................. C08L 39/00
(52) U.S. Cl. ........................ 524/555; 524/539; 524/808
(58) Field of Search ................................. 524/555, 539, 524/808

(56) References Cited

U.S. PATENT DOCUMENTS

| | | | | |
|---|---|---|---|---|
| 3,979,441 A | | 9/1976 | Hoke | 260/482 R |
| 4,741,790 A | * | 5/1988 | Hawe et al. | 156/71 |
| 5,053,448 A | * | 10/1991 | Tsaur | 524/460 |
| 5,098,479 A | * | 3/1992 | Hutter | 106/31.73 |
| 5,312,863 A | | 5/1994 | Van Rheenen et al. | 524/555 |
| 5,418,264 A | * | 5/1995 | Obloh et al. | 523/414 |
| 5,998,543 A | * | 12/1999 | Collins et al. | 524/808 |
| 6,316,538 B1 | * | 11/2001 | Anderson et al. | 524/514 |
| 6,407,158 B1 | * | 6/2002 | Kim et al. | 524/539 |

* cited by examiner

Primary Examiner—David W. Wu
Assistant Examiner—Henry S. Hu
(74) Attorney, Agent, or Firm—Morgan, Lewis & Bockius LLP

(57) ABSTRACT

The use of an amine functional polymer, including salts thereof, as a rheology modifier for solvent-based paints, inks, filled thermosetting resins and thermosetting resin-based gelcoats whereby the amine functional polymer contains not less that 42% by weight of the residue of one or more amine-containing monomers, or salts thereof, relative to the weight of the polymer. Preferably the amine functional polymer is obtainable from two or more monomers which contain at least one ethylenically unsaturated group such as styrene and 2-dimethylaminoethylmethacrylate.

24 Claims, No Drawings

THICKENERS

The present invention relates to the use of an amine functional polymer as a rheology modifier for non-aqueous paints, inks, filled thermosetting resins, thermosetting resin-based gelcoats and to millbases, paints and inks, filled thermosetting resins and thermosetting based gelcoats containing said rheology modifier. The ink includes that used in either impact or non-impact printing, including drop-on-demand (DOD) printing.

Solvent based coatings have a tendency to "sag" or run down when the coating is applied to inclined and particularly vertical surfaces. This is particularly true in the case of high solids coating formulations which are becoming increasing important with the need to reduce the Volatile Organic Compound (VOC) content of the coatings. There is thus a clear need for rheology modifying agents which reduce the tendency of coatings to sag. Ideally such rheology modifying agents should impart shear thinning properties on the coating such as high viscosity under low shear conditions to inhibit sag after application of the coating and low viscosity under high shear to permit flow and levelling of the coating during application.

Thermosetting resin based gelcoats, and filled thermosetting resins when used in spray and hand lay-up applications, also have a strong tendency to sag when applied to vertical surfaces. Typically this difficulty is addressed through the use of thixotropes such as fumed silicas, but their ultra-fine particulate state makes them difficult to handle in terms of both their ease of incorporation into formulations, and extremely dusty nature.

The relatively high density of most fillers used in thermosetting resins means that the said fillers may have a strong tendency to settle on storage, even for quite short periods of time, leaving an uneven distribution of filler between the different levels within the formulation, and even a dense sediment on the base of the container. This problem may be addressed by mechanical means (stirring or rolling the container), or by incorporation of an appropriate agent that will help the formulation to resist settling. Ideally such anti-settling agents should show shear thinning behaviour.

U.S. Pat. No. 3,979,441 discloses oil-soluble polymers of N-3-amino alkyl acrylamides such as N-(1,1-dimethyl-3-dimethylaminopropyl) acrylamide which are obtained by copolymerisation with a monomer such as an alkyl (meth) acrylate containing an alkyl group with at least 8 carbon atoms. The polymers are used as viscosity modifiers in lubricants but their use in paints is neither disclosed nor envisaged.

U.S. Pat. No. 5,312,863 discloses cationic latex coatings obtained by polymerising at least one ethylenically unsaturated monomer wherein at least one of the monomers contains a cationic functional group. Preferably, the concentration of the cationic functional monomer is from 0.5 to 15% by weight of the total polymerisable monomers used to prepare the cationic polymer, and more preferably from 1 to 5% by weight. There is no disclosure that such cationic polymers can be used as a rheology modifier (hereinafter "RM") in non-aqueous based paints and inks.

More recently, U.S. Pat. No. 5,098,479 discloses a process for preparing a hydrocarbon-soluble thickener for zinc-containing metal resinate inks which comprises the reaction product of
a) up to 99% by weight of an alkyl or cycloalkyl ester of (meth) acrylic acid;
b) up to 98% by weight styrene;
c) 1 to 40% by weight of an amine-containing monomer;
d) up to 20% by weight of a carboxyl-containing monomer; and
e) a catalytic amount of a free-radical polymerisation initiator.

These thickeners have all been specifically developed for use with metal resinates in gravure printing inks and none of the specific thickeners are made using more than 15% by weight amine-containing monomers.

It has now been found that improved resistance against sag, running or settling can be obtained if the RM polymer contains not less than 42% by weight of the residue of an amine containing monomer.

According to the invention there is provided the use of an amine functional polymer, including salts thereof, as a rheology modifier for solvent-based paints, inks, filled thermosetting resins and thermosetting resin-based gelcoats, whereby the amine functional polymer contains not less than 42% by weight of the residue of one or more amine-containing monomers, or salts thereof, relative to the total weight of the polymer.

The amine functional polymer, including salts thereof, is referred to hereinafter as AFP.

Preferably, the AFP contains not less than 45% and more preferably not less than 50% by weight of the residue of an amine-containing monomer relative to the total weight of the polymer.

It is also preferred that the AFP contains not greater than 90% and more preferably not greater than 80% by weight of the residue of an amine-containing monomer relative to the total weight of the polymer.

The weight average molecular weight (Mw) of the AFP is preferably between 30,000 and 250,000, more preferably between 40,000 and 100,000 and especially between 65,000 and 85,000.

The AFP is preferably obtainable from two or more monomers which contain at least one, and preferably, only one ethylenically unsaturated group.

In one preferred class of AFP, the amine-containing monomer is a compound of formula 1

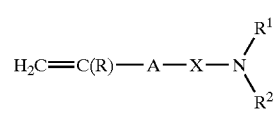

wherein
R is hydrogen or $C_{1-6}$-alkyl;
A is oxygen, sulphur, a group —COO— or a group —CONR$^3$— wherein R$^3$ is hydrogen or $C_{1-12}$-alkyl;
X is $C_{2-10}$-alkylene;
R$^1$ and R$^2$ is each, independently, hydrogen, hydroxyalkyl or $C_{1-12}$-alkyl; or
R$^1$ and R$^2$ together with the nitrogen atom to which they are attached, form a ring.

When R is $C_{1-6}$-alkyl, it is preferably $C_{1-4}$-alkyl such as methyl.

When X is alkylene, it may be linear or branched. Preferably at least two carbon atoms of the alkylene group are in a chain connecting A with the nitrogen atom.

When R$^1$ and/or R$^2$ is hydroxyalkyl it is preferably hydroxy-$C_{2-4}$-alkyl.

When R$^1$ and R$^2$ together with the nitrogen atom to which they are attached form a ring, the ring preferably contains 6 members such as morpholinyl, piperazinyl, pyridyl, pyrrolidinyl and N-alkylpiperidinyl such as N—$C_{1-18}$-alkyl- and especially N—$C_{1-6}$-alkyl piperidinyl.

Examples of the compounds of formula 1 are:
10-aminodecyl vinyl ether;
9-aminooctyl vinyl ether;
6-(diethylamino)hexyl (meth)acrylate;
2-(diethylamino)ethyl vinyl ether;
5-aminopentyl vinyl ether;
3-aminopropyl vinyl ether;
2-aminoethyl vinyl ether;
2-aminobutyl vinyl ether;
4-aminobutyl vinyl ether;
3-(dimethylamino)propyl (meth)acrylate;
2-(dimethylamino)ethyl vinyl ether;
N-(3,5,5-trimethylhexyl)aminoethyl vinyl ether;
N-cyclohexylaminoethyl vinyl ether;
3-(t-butylamino)propyl (meth)acrylate;
2-(1,1,3,3-tetramethylbutylamino)ethyl (meth)acrylate;
N-t-butylaminoethyl vinyl ether;
N-methylaminoethyl vinyl ether;
N-2-ethylhexylaminoethyl vinyl ether;
N-t-octylaminoethyl vinyl ether;
beta-morpholinoethyl (meth)acrylate;
4-(beta-acryloxyethyl) pyridine;
beta-pyrrolidinoethyl vinyl ether;
5-aminopentyl vinyl sulfide;
beta-hydroxyethylaminoethyl vinyl ether;
(N-beta-hydroxyethyl-N-methyl) aminoethyl vinyl ether;
hydroxyethyidimethyl (vinyloxyethyl) ammonium hydroxide;
2-(dimethylamino)ethyl (meth)acrylate;
2-(dimethylamino)ethyl (meth)acrylamide;
2-(t-butylamino)ethyl (meth)acrylate;
3-(dimethylamino)propyl (meth)acrylamide;
2-(diethylamino)ethyl (meth)acrylate;
2-(dimethylamino)ethyl (meth)acrylamide.

In a further preferred class of AFP, the amine containing monomer is a compound of formula 2

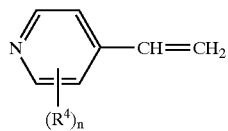

(2)

wherein
$R^4$ is hydrogen or $C_{1-12}$-alkyl; and
n is from 1 to 4.
Examples of amine functional monomers of formula 2 are 4-vinylpyridine, 2,6-diethyl-4-vinylpyridine, 3-dodecyl-4-vinylpyridine and 2,3,5,6-tetramethyl-4-vinylpyridine.

The quaternised form of weak base functional monomers such as those weak base functional monomers which have been reacted with alkyl halides, such as benzyl chloride and ethyl bromide or with epoxides such as ethyleneoxide and propyleneoxide, or with dialkylsulphate such as dimethylsulphate, can also be used. These monomers containing quaternary ammonium functional groups are also regarded as amine-functional monomers for the purpose of this invention.

In addition to the amine-containing monomer, the AFP may also contain the residue of one or more nonionic mono-ethylenically unsaturated monomers. Examples of such monomers are styrene, alpha-methyl styrene, vinyl toluene, vinyl naphthalene, ethylene, vinyl acetate, vinyl versatate, vinyl chloride, vinylidene chloride, acrylonitrile, meth-acrylonitrile, (meth)acrylamide, various $(C_1-C_{20})$ alkyl and $(C_3-C_{20})$alkenyl esters of (meth)acrylic acid; for example, methyl (meth)acrylate, ethyl (meth)acrylate, n-butyl(meth)acrylate, isobutyl(meth)acrylate, 2-ethylhexyl (meth)acrylate, cyclohexyl (meth)acrylate, n-octyl (meth)acrylate, n-decyl (meth)acrylate, n-dodecyl (meth)acrylate, tetradecyl (meth)acrylate, n-amyl (meth)acrylate, neopentyl (meth)acrylate, cyclopentyl (meth)acrylate, lauryl (meth)acrylate, oleyl (meth)acrylate, palmityl (meth)acrylate, and stearyl (meth)acrylate; other (meth)acrylates such as isobornyl (meth)acrylate, benzyl (meth)acrylate, phenyl (meth)acrylate, 2-bromoethyl (meth)acrylate, 2-phenylethyl (meth)acrylate, and 1-naphthyl (meth) acrylate; alkoxylalkyl (meth)acrylates such as ethoxyethyl (meth)acrylate; and dialkyl esters of ethylenically unsaturated di- and tricar-boxylic acids and anhydrides, such as diethyl maleate, dimethyl fumarate, trimethyl aconitate, and ethyl methyl itaconate.

The AFP may also contain the residue of one or more multi-ethylenically unsaturated monomers. The amount of multi-ethylenically unsaturated monomer is controlled in order not to produce a gel in preparation of the AFP. Examples of such monomers are allyl (meth)acrylate, tripropyleneglycol di(meth)acrylate, diethyleneglycol di(meth)acrylate, ethyleneglycol di(meth)acrylate, 1,6-hexanediol di(meth)acrylate, 1,3-butyleneglycol di(meth)acrylate, polyalkylene glycol di(meth)acrylate, diallylphthalate, trimethylolpropane tri(meth)acrylate, divinyl benzene, divinyl toluene, trivinyl benzene and divinyl naphthalene. The amount of multi-ethylenically unsaturated monomer is preferably less than 5%, more preferably less than 2% based on the total weight of monomers used to prepare the AFP.

Monomers containing functional groups which may be available for further reaction after synthesis of the AFP may also be included. Examples of such functional groups are hydroxy, carboxy and fatty acid. Examples of these functional monomers are 2-hydroxyethyl (meth)acrylate and (meth)acrylic acid.

The functional groups in the AFP derived from the functional monomers may be utilised to incorporate the AFP into the crosslinked matrix of a thermosetting or air drying coating composition. An example of this is where the AFP contains hydroxy functionality. Such an AFP may be incorporated into the crosslinked matrix of a hydroxy functional film-forming binder resin by use of a suitable crosslinking agent such as a polyisocyanate or melamine formaldehyde derivative in the coating composition. When the AFP contains the residue of a carboxy functional monomer the amount of such monomer is preferably less than 3% and especially less than 1% by weight based on the total weight of monomers.

The polymerisation conditions to produce the AFP should be selected to minimise reaction, if any, between the amine functional group and the post-polymerisation crosslinkable functional group. After polymerisation an appropriate multifunctional crosslinking agent can be reacted with crosslinkable functional groups pendant from the polymer chain. Alternatively, the amine functional group itself can serve as crosslinking site.

Some of the AFP's according to the invention are novel. Thus, according to a further aspect of the invention there is provided an amine-functional polymer (AFP) which comprises not less than 42% by weight of the AFP of a residue of an amine-containing monomer having an ethylenically unsaturated group and a residue of styrene, including salts thereof.

Preferably, the AFP further comprises the residue of an ethylenically unsaturated monomer which contains a hydroxyl group.

As a further aspect of the invention there is provided an AFP which comprises not less than 42% by weight of the AFP of an amine-containing monomer having an ethylenically unsaturated group and a residue of a $C_{1-6}$-alkyl (meth) acrylate, including salts thereof.

Useful AFP's have been prepared from styrene and 2-dimethylaminoethylmethacrylate (hereinafter DMAEMA) optionally containing up to 10% 2-hydroxyethylmethacrylate.

The AFP's used as rheology modifiers according to the present invention may be prepared by any method known to the art. However, it is preferred that the AFP is prepared by a solvent polymerisation process and that the solvent is selected for compatibility with the end-use paint or ink with which the AFP is to be used. The AFP may also be prepared by a standard batchwise process or by continuous feed of the monomers.

As a further variant, the AFP may be prepared by amine functionalisation of a preformed polymer which is substantially devoid of amine and/or cationic groups. However, it is much preferred that the AFP is prepared from two or more monomers, at least one of which is an amine-containing monomer.

As disclosed hereinbefore, the AFP is primarily of use as a RM in paints, inks, gelcoats and filled thermosetting resins but may also be used in any non-aqueous coating system which it is desired to thicken. Thus, the AFP may be part of a clear coating comprising a film-forming binder resin and an organic liquid which may optionally contain a particulate solid such as a pigment and optionally a dispersant to disperse the particulate solid when the binder resin does not act as dispersant.

According to a further aspect of the invention there is provided a composition comprising the AFP, organic liquid and a film-forming binder resin. The binder resin system may be that found typically in conventional coatings as well as high solids coatings. Illustrative examples are binders such as those based on alkyds, polyester-melamine, polyester-urea/formaldehyde, alkyd-melamine, alkyd-urea/formaldehyde, acrylic-melamine, acrylic-urea/formaldehyde, epoxy resins, epoxy ester-melamine, polyurethane resins, acrylic resins, oleoresins, unsaturated polyesters, polyvinyl acetates, polyvinyl chlorides or vinyl acrylics. The preferred resins comprise alkyds, polyester-melamine, polyester-urea/formaldehyde, alkyd-melamine, acrylic melamine or polyurethanes. The most preferred resins comprise polyester-melamine, acrylic-melamine or polyurethanes. Preferably, the binder resin is other than a metal resinate.

As a still further aspect of the invention there is provided a millbase, paint, ink or thermosetting resin-based gelcoat comprising the AFP, organic liquid and/or reactive monomer, particulate solid and a film-forming binder resin or a thermosetting resin. It is also preferred that the millbase, paint, ink or thermosetting resin-based gelcoat further comprises a dispersant to uniformly distribute the particulate solid throughout the organic liquid.

Preferably, the particulate solid is a pigment.

A further aspect of the invention provides a composition comprising the AFP, a thermosetting resin and optionally a reactive monomer. The resin may be that typically found in the thermosetting resin systems. Illustrative examples of such resins include unsaturated polyesters, poly(meth) acrylates, urethanes, urethane-acrylates, epoxy resins, vinyl esters, allyl resins, silicone resins, amino resins, phenolics, melamine formaldehydes and urea formaldehydes. Examples of reactive monomers include styrene and methyl methacrylate.

As a further aspect of the invention there is provided a filled thermosetting resin based composite comprising the AFP, a thermosetting resin system, a particulate solid material and optionally a reactive monomer. Preferably, the particulate solid material is wholly or mainly filler.

The organic liquid is preferably a polar organic medium or a substantially non-polar aromatic hydrocarbon, aliphatic hydrocarbon or halogenated hydrocarbon. By the term "polar" in relation to the organic medium is meant an organic liquid or resin capable of forming moderate to strong bonds as described in the article entitled "A Three Dimensional Approach to Solubility" by Crowley et al in Journal of Paint Technology, Vol. 38, 1966, at page 269. Such organic media generally have a hydrogen bonding number of 5 or more as defined in the abovementioned article.

Examples of suitable polar organic liquids are amines, ethers, especially lower alkyl ethers, organic acids, esters, ketones, glycols, alcohols and amides. Numerous specific examples of such moderately strongly hydrogen bonding liquids are given in the book entitled "Compatibility and Solubility" by Ibert Mellan (published in 1968 by Noyes Development Corporation) in Table 2.14 on pages 39–40 and these liquids all fall within the scope of the term polar organic liquid as used herein.

Preferred polar organic liquids are dialkyl ketones, alkyl esters of alkane carboxylic acids and alkanols, especially such liquids containing up to, and including, a total of 6 carbon atoms. As examples of the preferred and especially preferred liquids there may be mentioned dialkyl and cycloalkyl ketones, such as acetone, methyl ethyl ketone, diethyl ketone, di-isopropyl ketone, methyl isobutyl ketone, di-isobutyl ketone, methyl isoamyl ketone, methyl n-amyl ketone and cyclohexanone; alkyl esters such as methyl acetate, ethyl acetate, isopropyl acetate, butyl acetate, ethyl formate, methyl propionate, methoxy propylacetate and ethyl butyrate; glycols and glycol esters and ethers, such as ethyl glycol, 2-ethoxyethanol, 3-methoxypropylpropanol, 3-ethoxypropylpropanol, 2-ethoxyethyl acetate; alkanols such as methanol, ethanol, n-propanol, isopropanol, n-butanol and isobutanol and dialkyl and cyclic ethers such as diethyl ether and tetrahydrofuran.

The substantially non-polar, organic liquids which may be used, either alone or in admixture with the aforementioned polar solvents, are aromatic hydrocarbons, such as toluene and xylene, aliphatic hydrocarbons such as hexane, heptane, octane, decane, petroleum distillates such as white spirit, mineral oils, vegetable oils and halogenated aliphatic and aromatic hydrocarbons, such as trichloro-ethylene, perchloroethylene and chlorobenzene.

The particulate solid may be any inorganic or organic solid material which is substantially insoluble in the organic liquid at the temperature concerned and which it is desired to stabilise in a finely divided form therein.

Examples of suitable solids are pigments for solvent inks; pigments, extenders and fillers for paints and plastics materials; particulate ceramic materials; magnetic materials and magnetic recording media, fire retardants such as those used in plastics materials and biocides, agrochemicals and pharmaceuticals which are applied as dispersions in organic media.

A preferred solid is a pigment from any of the recognised classes of pigments described, for example, in the Third Edition of the Colour Index (1971) and subsequent revisions of, and supplements thereto, under the chapter headed "Pigments". Examples of inorganic pigments are titanium dioxide, zinc oxide, Prussian blue, cadmium sulphide, iron oxides, vermillion, ultramarine and the chrome pigments, including chromates, molybdates and mixed chromates and sulphates of lead, zinc, barium, calcium and mixtures and modifications thereof which are commercially available as greenish-yellow to red pigments under the names primrose, lemon, middle, orange, scarlet and red chromes. Examples of organic pigments are those from the azo, disazo, condensed azo, thioindigo, indanthrone, isoindanthrone, anthanthrone, anthraquinone, isodibenzanthrone, triphendioxazine, quinacridone and phthalocyanine series, especially copper phthalocyanine and its nuclear halogenated derivatives, and also lakes of acid, basic and mordant dyes. Carbon black, although strictly inorganic, behaves more like an organic pigment in its dispersing properties. Preferred organic pigments are phthalocyanines, especially copper phthalocyanines, monoazos, disazos, indanthrones, anthranthrones, quinacridones and carbon blacks.

Other preferred solids are: extenders and fillers such as calcium carbonate, alumina, alumina trihydrate (ATH), sand, china clay, talc, kaolin, silica, barytes and chalk; particulate ceramic materials such as alumina, silica, zirconia, titania, silicon nitride, boron nitride, silicon carbide, boron carbide, mixed silicon-aluminium nitrides and metal titanates; particulate magnetic materials such as the magnetic oxides of transition metals, especially iron and chromium, e.g. gamma-$Fe_2O_3$, $Fe_3O_4$, and cobalt-doped iron oxides, calcium oxide, ferrites, especially barium ferrites; and metal particles, especially metallic iron, nickel, cobalt and alloys thereof; agrochemicals such as the fungicides flutriafen, carbendazim, chlorothalonil and mancozeb and fire retardants such as aluminium trihydrate and magnesium hydroxide.

The dispersant is preferably a polyesteramine or polyester ammonium salt and is particularly the condensation product of a polyester and an amine, polyamine or polyimine, including salts thereof. Examples of suitable dispersants are those disclosed in GB 1,373,660, GB 2,001,083, EP 158, 406, EP 690,745, WO 98/19784 and WO 99/49963.

The millbase, paint, ink, thermosetting resin or thermosetting resin-based gelcoat may also contain other adjuvants such as fluidising agents, anti-sedimentation agents, plasticisers, levelling agents and preservatives. Preferred fluidising agents are those disclosed in GB 1,508,576, GB 2,108,143 and WO 01/14479.

As disclosed hereinbefore, the use of the AFP according to the invention exhibit advantage over those disclosed in U.S. Pat. No. 5,098,479. They exhibit superior anti-sag characteristics and exhibit no significant deleterious effects on other properties of the paint or ink such as gloss, haze and drying rates. The use of AFP according to the invention will also reduce settling and sedimentation of fillers and other particulate materials in filled thermosetting resins and thermosetting resin based gelcoats.

The amount of AFP in the paint, ink, filled thermosetting resin or thermosetting resin-based gelcoat, is preferably from 0.01% to 5.0%, more preferably from 0.1 to 1.0% and especially from 0.1 to 0.5% by weight based on the total weight of the paint or ink.

When the paint, ink, millbase, filled thermosetting resin or thermosetting resin-based gelcoat contains a resin which is substantially free from anionic groups it has been found that improved anti-sag and anti-settling properties are obtained by adding an organic compound containing two or more anionic groups (hereinafter OCA) to the paint, ink, millbase, filled thermosetting resin or thermosetting resin-based gelcoat. The improvement in anti-sag and anti-settling properties is particularly noted where the particulate solid contains substantially no anionic character or anionic surface coating and especially where the resin is substantially free from anionic groups.

The OCA may contain sulphate, sulphonate, phosphonate or especially phosphate groups. Preferably, the weight-average molecular weight of the OCA is not greater than 10,000, more preferably not greater than 5000 and especially not greater than 2000. It is also preferred that the number of anionic groups is not greater than four.

Preferred OCA's are substantially colourless (i.e. free from chromophoric groups) and are particularly alkoxylates, especially those derived from polytetrahydrofuran, butylene oxide, propylene oxide and especially ethylene oxide, including mixtures thereof.

It is particularly preferred that the OCA exhibits dispersant properties. Examples of such OCA's are the phosphate esters disclosed in WO 97/42252 and WO 95/34593.

The amount of OCA in the paint, ink, millbase, filled thermosetting resin or thermosetting resin-based gelcoat may be varied over a wide range but is preferably such that the number of anionic groups of the OCA does not exceed the number of basic groups of the AFP. Preferably the amount of OCA is such that the number of anionic groups of the OCA is not greater than 60%, more preferably not greater than 40% and especially not greater than 20% of the number of basic groups of the AFP.

The invention is now described in further detail in the following non-limiting examples wherein all references are to parts by weight unless expressed to the contrary.

EXAMPLES

A) Preparation of the AFP

A 500ml four necked round bottomed glass reaction flask was fitted with water cooled condenser, mechanical stirrer and thermocouple. The flask was purged with a flow of nitrogen for ≧1 hour and an atmosphere of nitrogen was maintained throughout the preparation. Methoxy propyl acetate (100 parts) and the monomers (as detailed in the table below for each example) were mixed. Approximately 20 mls of the mixture was set aside and the remainder added to the flask. The temperature of the reaction flask contents was raised to 100° C. with agitation by means of a thermostatically controlled oil bath. 0.5 part of initiator, 1,1'-azobis (cyclohexanecarbonitrile) was dissolved in the remaining 20 mls of monomer and added to the flask. The reaction temperature was maintained at 100° C. throughout. A further portion of the initiator (0.25 part) was added after 2 hours and again after 4 hours. Reaction was allowed to continue overnight (ca. 24 hours in total) before being allowed to cool to room temperature (20° C.). Conversions to polymer were measured gravimetrically and were all near quantitative.

Molecular weight of the polymer was determined by GPC relative to a polystyrene calibration curve under the following conditions.

| | |
|---|---|
| Columns: | Polymer Laboratories Mixed B gel columns (30 cm × 7.5 mm, 5 μm) |
| Temperature: | 35° C. |
| Eluant: | Tetrahydrofuran (THF) containing 0.1% v/v triethylamine |
| Flow rate: | 1.0 ml/min |
| Injection: | 100 μl of 0.1% w/v polymer in THF containing 0.1% w/v triethylamine |

Details of the polymers (AFP) are recorded in Table 1 below.

TABLE 1

| AFP | Amine Monomer | % wt | Comonomer(s) | % wt | $M_w$ | $M_n$ | Pdi |
|---|---|---|---|---|---|---|---|
| A |  |  | Styrene | 100 | 72800 | 41500 | 1.75 |
| B | DMAEMA | 33.5 | Styrene | 66.5 | 68300 | 34400 | 1.99 |
| 1 | DMAEMA | 42.6 | Styrene | 57.4 | 68400 | 32300 | 2.12 |
| 2 | DMAEMA | 60.2 | Styrene | 39.8 | 75700 | 35800 | 2.11 |
| 3 | DMAEMA | 75.4 | Styrene | 24.3 | 70500 | 28000 | 2.52 |
| 4 | DMAEMA | 58.9 | Styrene/HEMA | 39/2 | 72700 | 32700 | 2.22 |
| 5 | DMAEMA | 53.2 | Styrene/HEMA | 42.2/4.4 | 65600 | 28100 | 2.33 |
| 6 | DMAEMA | 56.5 | Styrene/HEMA | 37.4/6 | 84900 | 38600 | 2.20 |
| 7 | DEAEMA | 65 | Styrene | 35 | 81300 | 33800 | 2.42 |
| 8 | DEAEMA | 50 | Styrene | 50 | 75000 | 31300 | 2.40 |
| 9 | DMVBA | 50 | Styrene | 50 | 60200 | 22800 | 2.64 |
| 10 | DMVBA | 65 | Styrene | 35 | 53000 | 21500 | 2.47 |
| 11 | DMAEMA | 50 | EHMA | 50 | 140200 | 52400 | 2.68 |
| 12 | DMAEMA | 65 | EHMA | 35 | 142900 | 48500 | 2.97 |
| 13 | DEAEMA | 65 | EHMA | 35 | 120800 | 35400 | 3.41 |
| 14 | DEAEMA | 50 | EHMA | 50 | 121900 | 46000 | 2.65 |
| 15 | DMAPM | 50 | Sytrene | 50 | 35900 | 12300 | 2.92 |
| 16 | DEAEMA | 60 | EHMA/HEMA | 38/2 | 152500 | 49200 | 3.10 |
| 17 | DMAEMA | 50 | LMA | 50 | 162800 | 69200 | 2.35 |

Footnote to Table 1
DMAEMA is 2-(dimethylamino)ethyl methacrylate
DEAEMA is 2-(diethylamino) ethyl methacrylate
DMVBA is N,N-dimethylvinylbenzylamine
DMAPM is N-(3-(dimethylamino)propyl)-methacrylamide
HEMA is 2-hydroxyethylmethacrylate
EHMA is 2-ethylhexylmethacrylate
LMA is laurylmethacrylate
Control A is polystyrene
Control B is an AFP as disclosed in U.S. Pat. No. 5,098,479
$M_w$ is weight average molecular weight
$M_n$ is number average molecular weight
Pdi is polydispersity ($M_w/M_n$)

B) Evaluation of AFP in Paints

Examples 1 to 6

The AFP's were evaluated as RM in a white air-drying alkyd paint. A millbase was prepared by milling titanium dioxide (35 parts, Tioxide TR92 ex Tioxide Ltd) and a 20% alkyd resin formulation (18.3 parts, Synolac 50W ex Cray Valley Ltd). Synolac 50W contains 70% active solids in 26% white spirits and 4% Xylene. Milling was carried out for 15 minutes on a horizontal shaker in the presence of glass beads (3 mm, 125 parts).

The beads were separated and the paint diluted with 70% Synolac 5W (50 parts) and thoroughly mixed. The separated beads were stirred with 70% Synolac 50W (3.3 parts), white spirits (5.1 parts) and mixed driers (4.4 parts), separated and the resin mixture added to the paint. The mixed driers contained Nuodex Calcium (62.5 parts, 4% solution in white spirits ex Servo Delden BV), Nuodex Lead (10.4 parts, 24% solution) and Nuodex Cobalt (4.2 parts, 6% solution) in white spirits (22.9 parts).

The paint was drawn onto a horizontal glass panel using a 0.01 inch paint well and is allowed to dry at 20–25° C. for 16 hours. Haze and gloss were determined using a Byk-Gardner haze and gloss meter. The results are given in Table 2 below.

White paints were prepared containing 0.52% active solids AFP. Sag performance was assessed by drawing the paint down onto Black and White opacity charts using a Leneta anti-sag meter in the standard range (ASM-1). The Leneta sag meter has a metal drawdown bar which produces lines of paint varying in thickness from 75 to 300μ with an increase in thickness of 25μ between each line of paint. Immediately after application of the paint, the cards were stood vertically with the stripes running horizontally and with the thickest stripe at the bottom of the card. The paint was allowed to dry at 20° C. for 16 hours. Sag inhibition was assessed by determining the thickest paint film which had not sagged to contact the next lower horizontal stripe whilst drying. The results are given in Table 2 below using a scale of 12 to 3 (good to bad). (ie 300μ paint film thickness to 75μ paint film thickness, respectively).

TABLE 2

| Example | AFP | Styrene % wt | DMAEMA % wt | HEMA % wt | Mw | 20 deg Gloss | Haze | 60 deg. Gloss | Sag |
|---|---|---|---|---|---|---|---|---|---|
| Control | — |  |  |  |  | 86 | 15 | 92 | 4 |
|  | A | 100 | — |  | 72800 | 43 | 243 | 68 | 5 |
|  | B | 66.5 | 33.5 |  | 68300 | 84 | 35 | 92 | 8 |
| 1 | 1 | 57.4 | 42.6 |  | 68400 | 81 | 20 | 89 | 11 |
| 2 | 2 | 39.8 | 60.2 |  | 75700 | 80 | 14 | 88 | 12 |

TABLE 2-continued

| Example | AFP | Styrene % wt | DMAEMA % wt | HEMA % wt | Mw | 20 deg Gloss | Haze | 60 deg. Gloss | Sag |
|---|---|---|---|---|---|---|---|---|---|
| 3 | 3 | 24.3 | 75.4 | | 70500 | 79 | 16 | 88 | 12 |
| 4 | 4 | 39 | 58.9 | 2 | 72700 | 78 | 23 | 88 | 12 |
| 5 | 5 | 42.2 | 53.2 | 4.4 | 65600 | 78 | 15 | 88 | 12 |
| 6 | 6 | 37.4 | 56.5 | 6 | 84900 | 75 | 43 | 87 | 12 |

Footnote to Table 2
The legends in Table 2 are as explained in the footnote to Table 1.

Examples 7 to 12

Examples 1 to 6 were repeated except using 0.26% active solids AFP. The results are given in Table 3 below.

TABLE 3

| Example | AFP | Styrene % wt | DMAEMA % wt | HEMA % wt | Mw | 20 deg Gloss | Haze | 60 deg. Gloss | Sag |
|---|---|---|---|---|---|---|---|---|---|
| Control | — | | | | | 86 | 15 | 92 | 4 |
| | A | 100 | | | 72800 | 82 | 91 | 91 | 4 |
| | B | 66.5 | 33.5 | | 68300 | 82 | 43 | 93 | 5 |
| 7 | 1 | 57.4 | 42.6 | | 68400 | 85 | 36 | 91 | 7 |
| 8 | 2 | 39.8 | 60.2 | | 75700 | 85 | 18 | 91 | 8 |
| 9 | 3 | 24.3 | 75.4 | | 70500 | 84 | 25 | 92 | 7 |
| 10 | 4 | 39 | 58.9 | 2 | 72700 | 84 | 19 | 91 | 7 |
| 11 | 5 | 42.2 | 53.2 | 4.4 | 65600 | 83 | 17 | 91 | 9 |
| 12 | 6 | 37.4 | 56.5 | 6 | 84900 | 73 | 82 | 87 | 12 |

Footnote to Table 3
The legends are as explained in the footnote to Table 1.

Examples 13 to 27

Examples 1 to 6 were repeated using a paint containing a black pigment and a polyester film-forming binder resin.

The millbase contained carbon black (3.36 parts, Black FW 200 ex Degussa AG, 10% pigment), n-butanol (3.06 parts), methoxypropylacetate (2.52 parts), polyesteramine dispersant (5.55 parts, Solsperse 32500 ex Avecia Ltd, 66% active ingredient on weight of pigment), dispersant synergist (1.1 parts Solsperse 5000 ex Avecia Ltd, 33% active ingredient on weight of pigment), and polyester resin (18.0 parts, Aroplaz 6755-A6-80 ex Reichold Chemicals Inc. 80% solids in 13% methoxypropylacetate and 7% toluene).

After milling, the millbase was letdown with n-butanol (2.15 parts), methoxypropylacetate (8.15 parts), polyester resin (22.0 parts, Aroplaz 6755-A6-80) and melamineformaldehyde resin (16.97 parts, MF 210-0041 ex ICI PLC as 67% solids in 6.6% n-butanol and 26.4% xylene).

The amount of AFP in the black paint was 0.2% by weight active material.

Gloss was determined as described in Examples 1 to 6 except that the paint was first dried at 20° C. for 30 minutes prior to curing for 30 minutes at 140° C. The results are given in Tables 4 and 4a below.

Sag performance was also determined as described in Examples 1 to 6 except that the cards were dried at 20° C. for 30 minutes in the vertical position after application of the paint and again cured for 30 minutes at 140° C. The sag results are also detailed in Table 4 and 4a.

TABLE 4

| Example | AFP | Styrene % wt | DMAEMA % wt | HEMA | wt Mw | 20 deg Gloss | Haze | 60 deg. Gloss | Sag |
|---|---|---|---|---|---|---|---|---|---|
| Control | — | | | | | 80 | 80 | 91 | 5 |
| 13 | 2 | 39.8 | 60.2 | | 75700 | 83 | 70 | 92 | 12 |
| 14 | 4 | 39 | 58.9 | 2 | 72700 | 80 | 95 | 91 | 9 |
| 15 | 5 | 42.2 | 53.2 | 4.4 | 65600 | 83 | 64 | 92 | 9 |
| 16 | 6 | 37.4 | 56.5 | 6 | 84900 | 81 | 73 | 91 | 12 |

TABLE 4a

| Example | AFP | Amino Monomer | % wt | Comonomer(s) | % wt | Mw | 20 deg Gloss | Haze | 60 deg. Gloss | Sag |
|---|---|---|---|---|---|---|---|---|---|---|
| Control | — | | | | | | 83 | 50 | 93 | 5 |
| 17 | 7 | DEAEMA | 65 | Styrene | 35 | 81300 | 83 | 83 | 92 | 12 |
| 18 | 8 | DEAEMA | 50 | Styrene | 50 | 75000 | 81 | 90 | 90 | 12 |
| 19 | 9 | DMVBA | 50 | Styrene | 50 | 60200 | 67 | 84 | 93 | 10 |
| 20 | 10 | DMVBA | 65 | Styrene | 35 | 53000 | 76 | 74 | 92 | 12 |
| 21 | 11 | DMAEMA | 50 | EHMA | 50 | 140200 | 71 | 107 | 90 | 12 |
| 22 | 12 | DMAEMA | 65 | EHMA | 35 | 142900 | 82 | 66 | 92 | 12 |
| 23 | 13 | DEAEMA | 65 | EHMA | 35 | 120800 | 79 | 89 | 92 | 12 |
| 24 | 14 | DEAEMA | 50 | EHMA | 50 | 121900 | 57 | 167 | 90 | 12 |
| 25 | 15 | DMAPM | 50 | Styrene | 50 | 35900 | 70 | 103 | 90 | 12 |
| 26 | 16 | DEAEMA | 50 | EHMA/HEMA | 38/2 | 152500 | 50 | 164 | 89 | 12 |
| 27 | 17 | DMAEMA | 50 | LMA | 50 | 162800 | 83 | 65 | 93 | 12 |

Footnote to Tables 4 and 4a
The legends are as explained in the footnote to Table 1.

Example 28
Evaluation of AFP in Filled Thermosetting Resin

The AFP was evaluated as an anti-sedimentation agent in a filled unsaturated polyester resin system.

A dispersion was prepared by pre-mixing a 40% by weight solution of AFP2 in methoxypropyl acetate (0.25 parts) dispersant which is a diphosphate ester of a polyalkyleneglycol, (0.5 parts Dispersant 10 of WO 97/42252) and a mixture of unsaturated polyester resin (50 parts Crystic 471 PALV, Ex Scott Bader) and styrene (2.5 parts Aldrich Chemical Co) for 5 minutes using a dispermat mixer. Alumina trihydrate (50 parts, FRF40, ex Alcan Chemicals) was added and mixed in for 15 minutes at 2000 revolutions/minute. The mixture was poured into a 120 ml clear glass jar, sealed and left undisturbed for 24 hours. Upon observation, no clear layer was observed at the top of the mixture.

A control was prepared by milling alumina trihydrate (50 parts FRF40, ex Alcan Chemicals) in a mixture of unsaturated polyester resin (50 parts, Crystic 471 PALV, ex Scott Bader) and styrene (2.5 parts, ex Aldrich Chemical CO). Milling was carried out on Dispermat F1 high-speed mixer, using a 45mm diameter saw-toothed blade, for 15 minutes at 2000 revolutions/minute. The dispersion was poured into a 120 ml clear glass jar, sealed and left undisturbed for 24 hours. Upon subsequent examination the dispersion had a clear layer of approximately 10 mm depth at the top of the mixture.

Examples 29 and 30

A 500 ml four-necked round bottomed glass reaction flask was fitted with a water-cooled condenser, stirrer and thermocouple. The flask was purged with nitrogen for about 1 hour and a steady flow of nitrogen was maintained throughout the polymerisation. A non-polar solvent (158.5 parts, Solvesso 150) was added to the flask together with 2-(dimethylamino) ethylmethacrylate (47.1 parts) and either butylmethacrylate (BMA, 59.4 parts) or 2-ethylhexylmethacrylate (EHMA, 59.4 parts). A small aliquot of the monomers was removed and $1,1^1$-azobis (cyclohexanecarbonitrile) (AIBN, 0.32 parts) dissolved in the mixture. The monomers were heated to 80° C. and the AIBN solution added with stirring. After 4 hours, 0.1 part AIBN was added and polymerisation continued with stirring at 80–90° C. for a further 20 hours. These are AFP 18 and 19 respectively. Their composition and molecular weight are recorded in Table 5 below.

Example 31

Examples 29 and 30 were repeated except 150 parts Solvesso 150 were charged to the flask with styrene (41.6 parts) and 2-(diethylamino) ethylmethacrylate (62.8 parts).

The monomers were heated to 80° C. and AIBN (0.61 parts) disclosed in Solvesso 150 (6.6 parts) was added. Polymerisation was effected by stirring at 80–90° C. under nitrogen for 16 hours. This is AFP 20. The composition and molecular weight is given in Table 5 below.

TABLE 5

| AFP | Amine Monomer | % wt | Comonomer(s) | % wt | $M_w$ | $M_n$ | Pdi |
|---|---|---|---|---|---|---|---|
| 18 | DMAEMA | 44.2 | BMA | 55.8 | 78800 | 41000 | 1.92 |
| 19 | DMAEMA | 44.2 | EHMA | 55.8 | 55800 | 23100 | 2.42 |
| 20 | DMAEMA | 60 | Styrene | 40 | 48600 | 24900 | 1.95 |

Footnote to Table 5
DMAEMA, EHMA, $M_w$, $M_n$ and Pdi are as explained in the footnote to Table 1.
BMA is butylmethacrylate.

Examples 32 to 34

AFP's 18 to 20 were evaluated in a white alkyd paint formulation as described in Examples 1 to 6 at a loading of 1.25% and 0.41% by weight based on the total weight of the paint formulation. The results are given in Table 6 below.

TABLE 6

| | Amine Monomer | % wt | Comonomer | % wt | Mw | 1.25% AFP | | | | 0.41% AFP | | | |
| AFP | | | | | | 20 deg gloss | Haze | 60 deg gloss | sag | 20 deg gloss | Haze | 60 deg gloss | sag |
|---|---|---|---|---|---|---|---|---|---|---|---|---|---|
| 18 | DMAEMA | 44.2 | BMA | 55.8 | 78800 | 81 | 9 | 86 | 12 | 85 | 12 | 92 | 8 |
| 19 | DMAEMA | 44.2 | EHMA | 55.8 | 55800 | 83 | 14 | 90 | 10 | | | | |
| 20 | DMAEMA | 60 | Styrene | 40 | 48600 | 80 | 9 | 88 | 12 | 84 | 10 | 91 | 12 |

What is claimed is:

1. An organic solvent-based coating composition comprising a film-forming binder resin, an organic liquid and an amine functional polymer, wherein the amine functional polymer contains not less than 42% by weight of the residue of one or more amine containing monomers, or salts thereof, relative to the total weight of the polymer.

2. An organic solvent-based coating composition as claimed in claim 1 which further comprises a pigment.

3. An organic solvent-based coating composition as claimed in claim 2 which further comprises a dispersant.

4. An organic solvent-based coating composition as claimed in claim 3 wherein the dispersant is the condensation product of a polyester with an amine, polyamine or polyimine.

5. An organic solvent-based coating composition as claimed in claim 1 selected from the group consisting of organic solvent-based paints, inks, filled thermosetting resins and thermosetting resin-based gelcoats, wherein the amine functional polymer, including salts thereof, is a rheology modifier.

6. An organic solvent-based coating composition as claimed in claim 1 wherein the residue of amine-containing monomer is not less than 50% by weight of the amine functional polymer.

7. An organic solvent-based coating composition as claimed in claim 1 wherein the residue of amine-containing monomer is not greater than 80% by weight of the amine functional polymer.

8. An organic solvent-based coating composition as claimed in claim 1 wherein the weight average molecular weight of the polymer is between 30,000 and 250,000.

9. An organic solvent-based coating composition as claimed in claim 1 wherein the amine functional polymer is obtainable from two or more monomers which contain at least one ethylenically unsaturated group.

10. An organic solvent-based coating composition as claimed in claim 1 wherein the amine-containing monomer is a compound of formula 1:

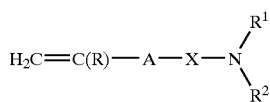

wherein
R is hydrogen or C1,4-alkyl;
A is oxygen, sulphur, a group —COO— or a group —CONR$^3$— wherein R$^3$ is hydrogen or C$_{1-12}$-alkyl
X is C$_{2-10}$-alkylene,
R$^1$ and R$^2$ is each, independently, hydrogen, hydroxyalkyl or C$_{1-12}$-alkyl; or R$^1$ and R$^2$ together with the nitrogen atom to which they are attached form a ring.

11. An organic solvent-based coating composition as claimed in claim 10 wherein R is methyl.

12. An organic solvent-based coating composition as claimed in claim 10 wherein there are at least two carbon atoms in X connecting A with the nitrogen atom.

13. An organic solvent-based coating composition as claimed in claim 10 wherein the ring formed by R$^1$ and R$^2$ together with the nitrogen atom to which they are attached is morpholinyl, piperazinyl, pyridyl, pyrrolidinyl or N—C$_{1-18}$-alkyl piperidinyl.

14. An organic solvent-based coating composition as claimed in claim 1 wherein the amine-containing monomer is 2-dimethylaminoethylmethacrylate or 2-diethylaminoethylmethacrylate.

15. An organic solvent-based coating composition as claimed in claim 1 wherein the amine-containing monomer is a compound of formula 2

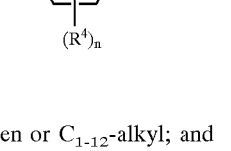

wherein
R$^4$ is hydrogen or C$_{1-12}$-alkyl; and
n is from 1 to 4.

16. An organic solvent-based coating composition as claimed in claim 1 wherein the amine functional polymer contains the residue of one or more nonionic mono-ethylenically unsaturated monomer.

17. An organic solvent-based coating composition as claimed in claim 16 wherein the non-ionic monomer is styrene.

18. An organic solvent-based coating composition as claimed in claim 1 wherein the amine-functional polymer comprises not less than 42% by weight of the polymer of a residue of an amine-containing monomer having an ethylenically unsaturated group and a residue of styrene, including salts thereof.

19. An organic solvent-based coating composition as claimed in claim 1 wherein the amine-functional polymer comprises not less than 42% by weight of the polymer of a residue of an amine-containing monomer having an ethylenically unsaturated group and a residue of a C$_{1-6}$-alkyl (meth)acrylate, including salts thereof.

20. An organic solvent-based coating composition as claimed in claim 18 or claim 19 wherein the amine-functional polymer comprises a residue of an ethylenically unsaturated monomer which contains a hydroxyl group.

21. An organic solvent-based composition comprising a film-forming binder resin, a particulate solid, an organic liquid, an organic compound containing two or more anionic groups and an amine functional polymer, wherein the amine functional polymer contains not less than 42% by weight of the residue of one or more amine-containing monomers, or salts thereof, relative to the total weight of the polymer.

22. An organic solvent-based composition as claimed in claim 21 wherein the binder resin is a thermosetting resin or thermosetting resin-based gelcoat.

23. An organic solvent-based composition comprising a film-forming binder resin, an organic liquid, an organic compound containing two or more anionic groups and an amine functional polymer, wherein the amine functional polymer contains not less than 42% by weight of the residue of one or more amine-containing monomers, or salts thereof, relative to the total weight of the polymer.

24. An organic solvent-based millbase, paint or ink comprising a film-fomiing binder resin, an organic liquid, a pigment and an amine functional polymer, wherein the amine functional polymer contains not less than 42% by weight of the residue of one or more amine-containing monomers, or salts thereof, relative to the total weight of the polymer.

* * * * *